3,051,668
PROCESS FOR THE PRODUCTION OF STABLE AQUEOUS DISPERSIONS OF POLYMERIZED VINYLESTERS
Hans Bauer, Eduard Bergmeister, and Joseph Heckmaier, all of Burghausen, Upper Bavaria, Germany, assignors to Wacker-Chemie G.m.b.H., Munich, Germany, a German firm
No Drawing. Filed July 20, 1959, Ser. No. 828,062
Claims priority, application Germany Aug. 1, 1958
4 Claims. (Cl. 260—17)

The emulsion polymerization of vinyl esters alone or as copolymers with other unsaturated polymerizable organic compounds is ordinarily carried out with the addition of protective colloids to the system. Various protective colloids are suitable for this purpose. These include those water-soluble polymerization products which are prepared by synthetic procedures such as polyvinyl alcohol and its water-soluble derivatives, as well as those colloids which occur naturally such as gum arabic and gelatin, as well as some water-soluble cellulose derivatives. The chemical composition or structure of all these materials is not entirely uniform or homogeneous and for this reason the arrangement and distribution of the acetate groups in a partially saponified polyvinyl acetate, for example, is not always the same. Accordingly, the physical properties and colloidal action of these materials are subject to considerable variation and even though it can be shown by accepted test methods that various samples may have the same interfacial tension it has also been observed that these same samples may vary widely in their solubility in water. During the polymerization reaction, especially when carried out on a commercial scale, these variations are quite liable to cause major difficulties. Variation in water-solubility of the several constituents of the colloids at the usual polymerization temperatures has a pronounced effect upon the size of the polymer particles and rather coarse particles or agglomerates may frequently be formed in the polymer dispersion. In addition to the usual spherical particles which are formed, elliptical as well as rod-shaped particles may also be formed due to these variations in colloid structure. When even a minor proportion of these abnormally-shaped particles is present, even as little as 1% of particles having a diameter of from 10 to 200 microns where the normal or usual distribution of particle size is from 0.5 to 3 microns, the effect of these abnormal particles upon the properties of the resulting dispersion is quite marked and not only are the flow properties affected adversely but the stability of the dispersion is also reduced and a precipitate is more readily formed upon long standing. In addition, films formed from these dispersions exhibit various faults including surface irregularities, limited clarity and visual distortion.

It is, therefore, an important object of this invention to provide a process for the polymerization of vinyl esters and for the copolymerization of vinyl esters with other polymerizable esters in the presence of the usual water-soluble activating agents and protective colloids, as well as anionic emulsifying agents, which will yield polymers of fine and extremely uniform particle size and which will also have a high degree of homogeneity in their properties.

Other objects of this invention will appear from the following detailed description.

It has now been found that if the polymerization of vinyl esters or of mixtures of a vinyl ester and an ester copolymerizable therewith is carried out in the usual manner in the presence of an anionic emulsifying agent but in the presence of a salt of a metal of group IIa of the periodic system, or of aluminum, with a molar equivalent of the metal being present for each mole of emulsifying agent, the polymer obtained is extremely homogeneous and not only with respect to the particle size of the polymer in the dispersion obtained but also with respect to the properties of the polymer particles.

The novel process of this invention is carried out in an aqueous medium and the aqueous medium employed may be neutral or at a weakly acid pH. In addition to the salt and anionic emulsifying agent the process is carried out in the presence of the usual activators and protective colloids.

The production of a stable dispersion of the polymer obtained by use of the process described is quite surprising since it was known that the suspension polymerization of monomers employing protective colloids or emulsifying agents did not yield stable dispersions when the polymerization was carried out in the presence of polyvalent salts. In fact, it was well known that the presence of salts of polyvalent metals in emulsions and dispersions seriously impaired their mechanical stability. In fact, an emulsion containing an anionic emulsifying agent can easily be broken by the addition of these salts.

For these reasons it was quite surprising that the process described would yield an emulsion having not only very fine particle size but a high order of homogeneity and mechanical stability. An additional advantage which the emulsions obtained by the process described possess is that contrary to the tendency which emulsions containing anionic emulsifying agents have to form a froth or scum on their surface, the instant emulsions are entirely free of that tendency.

As examples of protective colloids which may be employed there may be mentioned polyvinyl alcohol and its water-soluble derivatives, especially those obtained by saponifying a polyvinyl alcohol ester and having 80 to 90 mol percent of free alcohol groups, as well as gum arabic, gum tragacanth, gelatin, and water-soluble cellulose derivatives, particularly hydroxyethyl cellulose. Preferably, the protective colloid is employed in an amount of from 0.3 to 5% by weight of the mixture.

In many instances, especially where it is desired to obtain polymers of extremely small particle size, or where a protective colloid is being employed in order that the decrease in interfacial tension will be held to a minimum, for example, when employing completely saponified polyvinyl alcohol or hydroxyethyl cellulose as the protective colloid, it is of substantial value also to include a non-ionic emulsifying agent in the reaction mixture. These may be, for example, long-chain alkyl-, aryl- or alkyl/aryl ethers of those polyethylene glycols containing from 5 to 30 —$C_2H_4O$— units in the polymer chain and in an amount of from 0.2 to 2% on the weight of the mixture.

The advantageous results obtained in accordance with the process of the present invention can be obtained with such water soluble salts of metals of group IIa of the periodic system as magnesium chloride or calcium chloride, or with aluminum salts such as aluminum sulfate when employed in equivalent amount to the anionic emulsifying agent present. The latter are ordinarily available in the form of their sodium salts. However, in place of employing a mixture of the usual anionic emulsifying agent and water-soluble salt it has been noted that similar results are obtained if an aluminum salt or an alkaline earth metal salt of the acid moiety of an anionic emulsifying agent is employed. As examples of the anionic emulsifying agents which are suitable there may be mentioned the long-chain alkyl sulfonic acids, alkylaryl sulfonic acids, where the alkyl chain is from 12 to 18 carbon atoms, long-chain alkyl sulfuric acids or sulfates, and the dialkylesters of sulfosuccinic acid such as the dihexyl, diamyl and dioctyl esters. These may all be found in "Soap & Chemical Specialties" of December 1957, and January, February, March and April 1958. The calcium and magnesium salts are particularly suitable and especially those of the long-chain alkyl sulfonic acids and those of the dialkylesters of sulfosuccinic acid. When these salts are employed the upper limit is about 0.5% on the weight of the reaction mixture and preferably the amount employed should be from 0.02 to about 0.2% by weight.

The polymerization is carried out with agitation in the manner well known to the art and preferably under neutral or weakly acid pH conditions. A water-soluble peroxide is employed which may be hydrogen peroxide, an organic hydroxyperoxide or even a persulfate, and in some instances it is advantageous to include a reducing agent so that a redox system is present.

The process of the present invention is suitable for the emulsion polymerization of vinyl esters such as, for example, vinyl acetate and vinyl propionate and is also suitable for the copolymerization of these esters with vinyl esters of higher molecular weight such as vinyl laurate, vinyl stearate or other polymerizable esters of unsaturated aliphatic acids such as acrylic acid esters, maleic acid esters or fumaric acid esters.

In order further to illustrate this invention, the following examples are given in which the parts given are parts by weight:

Example 1

Into a reaction vessel provided with stirring means and a reflux condenser are introduced 300 parts by weight of a 10% aqueous solution of a partially saponified polyvinyl alcohol having a saponification value of 140, 0.8 part of hydrogen peroxide and 100 parts of vinyl acetate, the mixture heated to 65° C. and polymerization is carried out in the usual manner while adding an additional 170 parts by weight of vinyl acetate. A viscous emulsion is obtained containing about 50% solids and having the characteristics given below under column A.

The procedure described above is repeated but 0.1% by weight of the calcium salt of a long-chain paraffin sulfonate is added to the mixture undergoing polymerization and a polymer emulsion having the characteristics set out under column B is obtained.

The procedure above is again repeated but in this instance there are added 0.1% by weight of the sodium salt of a long-chain paraffin sulfonate and 0.04% by weight of calcium chloride ($CaCl_2 \cdot 6H_2O$) which is the amount stoichiometrically equivalent to the sodium hydrocarbon sulfonate salt. An emulsion having the characteristics set out under column C is obtained.

|  | A | B | C |
|---|---|---|---|
| Sediment Volume | 0.06 ml | 0.01 ml | 0.005 ml |
| Particle Size | 2–4$\mu$; many aggregates up to 40$\mu$; flaky. | 1–3$\mu$; some aggregates to 6$\mu$. | 2–3$\mu$; some aggregates to 7$\mu$. |
| Film Appearance | grainy | smooth, fine-grained. | smooth, fine-grained. |
| Foam Height | 175 | 180 | 160. |

*Sediment volume.*—This value is determined by adding 1 gram of the dispersion obtained to 100 ml. of water and after mixing until homogeneous the mixture is placed in a sedimentation tube and allowed to stand. The sedimentation volume is the volume of sediment formed measured in ml. after standing for one hour.

*Foam height.*—33 parts by weight of the dispersion obtained are added to 67 parts of water and the mixture strongly agitated for two minutes in a suitably calibrated shaking cylinder. The foam height is then measured in millimeters.

It is apparent from the results tabulated above that the emulsions obtained by the process of the present invention are quite homogeneous with respect to particle size, they yield smooth films, and it is apparent that the desired result is achieved regardless of whether one employs an alkaline earth metal salt of an anionic emulsifying agent during the polymerization or whether one employs a water-soluble alkaline earth metal salt together with the anionic emulsifying agent.

Example 2

Into a reaction vessel equipped with a reflux condenser are introduced 250 parts by weight of water in which are dissolved 20 parts of partially saponified polyvinyl alcohol having a saponification value of 140, 0.3 part of the sodium salt of a long-chain paraffin sulfonic acid (molecular weight 250), 0.12 part of calcium chloride ($CaCl_2 \cdot 6H_2O$) and 0.4 part by weight of hydrogen peroxide. The mixture is heated to 65° C. and then, over the course of two hours, 365 parts of vinyl acetate are added. Polymerization is effected in the usual fashion. A stable, viscous dispersion of polyvinyl acetate is obtained containing about 60% by weight of solids. The properties of this emulsion are given in the table below under column A.

The above procedure is repeated twice but in the first instance the calcium chloride is omitted, the emulsion properties being listed under column B and in the other both the calcium chloride and the sodium salt of the paraffin sulfonic acid are omitted. The properties of the emulsion obtained are given under column C. The comparison of the properties of the several emulsions prepared in this manner is found in the following tabulation:

|  | A | B | C |
|---|---|---|---|
| Sediment Volume | 0.01 ml | 0.07 ml | 0.07 ml. |
| Particle Size | 1–3$\mu$; some aggregates 10–20$\mu$; few flakes. | 1–3$\mu$; many aggregates up to 15$\mu$; many flaky particles up to 100$\mu$. | same as B. |
| Film Appearance | smooth, fine-grained. | grainy | grainy. |
| Foam Height | 155 | 200 | 155. |

It can be seen from the above comparison that the emulsion procedure yielding emulsion A is quite superior to the other two. The amount of sediment formed, considering the particle size, is quite small and it will be noted that the maximum particle size is much smaller; this emulsion yields a smooth film and the tendency of this emulsion to form a foam is less than that of the emulsion prepared when the sodium salt of the paraffin sulfonic acid anionic emulsifying agent is used alone and it is no higher than that of the emulsion in which both the emulsifying agent and salt were omitted.

Example 3

15 parts by weight of polyvinyl alcohol with a saponification value of 140, 0.3 part by weight of the sodium salt of dodecylsulfate and 0.12 part by weight of magnesium chloride ($MgCl_2 \cdot 6H_2O$) are dissolved in 285 parts by weight of water. To the solution obtained are added 225 parts by weight of vinyl acetate and 75 parts by weight of vinyl caproate as well as 0.18 part of tartaric acid, 0.3 part of hydrogen peroxide and 0.005 part of cobalt acetate as the catalyst system. The mixture is heated with stirring and under reflux and polymerization is effected. The polymer dispersion obtained contains about 50% by weight of solids and the particle size and distribution are very closely similar to that given under column A in Example 1.

Example 4

12 parts by weight of gum arabic, 0.2 part by weight of the sodium salt of the long-chain paraffin sulfonic acid and 0.08 part of calcium chloride are dissolved in 290 parts by weight of water and 300 parts by weight of vinyl acetate are added. The catalyst employed is the same as that in Example 2 and upon emulsification a stable polymer dispersion containing 50% solids is obtained having a sedimentation volume of 0.01 ml. When the above emulsion polymerization procedure is carried out omitting the calcium salt of the anionic emulsifying agent the sedimentation volume of the polymer dispersion thereby formed is 0.04 ml.

*Example 5*

To a vessel equipped with a stirrer and a reflux condenser are added 195 parts by weight of water, 50 parts of a 6% aqueous solution of hydroxyethyl cellulose, 2 parts by weight of an alkylarylpolyoxyethylene ether having about fifteen oxyethylene units in the chain and 0.3 part by weight of the sodium salt of a long-chain paraffin sulfonic acid. 0.12 part by weight of calcium chloride is then added. After the addition of 175 parts by weight of vinyl acetate and 75 parts by weight of dibutylmaleate the mixture is pre-emulsified with the aid of a centrifugal pump circulating the vessel contents. The vessel is then flushed with nitrogen and 0.9 part by weight of tertiary butylperoxide and 0.2 part of formaldehyde sulfoxylate are added. The mixture is heated to 65° C. and polymerized under reflux. After an additional 0.4 part by weight of formaldehyde sulfoxylate dissolved in some water is added, the reaction is completed.

A creamy dispersion is obtained containing 50% solids which spreads easily and yields a smooth, bright film of glass-like clarity. If the above process is carried out without the addition of the calcium chloride and the sodium salt of the long-chain paraffin sulfonic acid, the emulsion obtained is quite viscous and difficult to spread and films formed from this emulsion are cloudy, dull and have an irregular surface.

A dispersion with very desirable properties is obtained if in the process described in this example the 0.3 part by weight of the long-chain paraffin sulfonic acid sodium salt is replaced by 0.45 part by weight of an anionic emulsifying agent comprising the sodium salt of dioctylsulfosuccinic acid.

We claim:
1. In a process for the production of stable, aqueous emulsions of polymers of vinyl acetate and copolymers of vinyl acetate with polymerizable esters of unsaturated aliphatic acids wherein emulsion polymerization is effected in an aqueous medium at about neutral pH and containing an anionic emulsifying agent as well as a protective colloid, the step which comprises effecting said emulsion polymerization in the presence of a compound selected from the group consisting of (A) the chloride and sulfate salts of a metal of the group consisting of metals of group IIa of the periodic system and aluminum, said salt being present in an amount stoichiometrically equivalent to the acid moiety of the anionic emulsifying agent, and (B) the salt of a metal of said group with the acid moiety of the anionic emulsifying agent, said metal salt being used in an amount of about 0.02 to 0.5% by weight of the reaction mixture.

2. Process in accordance with claim 1 wherein the emulsion polymerization is carried out in the presence of a protective colloid comprising a member of the group consisting of polyvinyl alcohol and its water-soluble derivatives.

3. Process in accordance with claim 1 wherein hydroxyethyl cellulose is present during emulsion polymerization as a protective colloid.

4. Process in accordance with claim 1 wherein the medium employed for said emulsion polymerization also contains a non-ionic emulsifying agent.

References Cited in the file of this patent

UNITED STATES PATENTS

| | | |
|---|---|---|
| 2,109,981 | Voss et al. | Mar. 1, 1938 |
| 2,473,929 | Wilson | June 21, 1949 |
| 2,536,470 | Schoenholz et al. | Jan. 2, 1951 |
| 2,777,836 | Everard et al. | Jan. 15, 1957 |
| 2,838,466 | Padbury et al. | June 10, 1958 |